Figure 1:
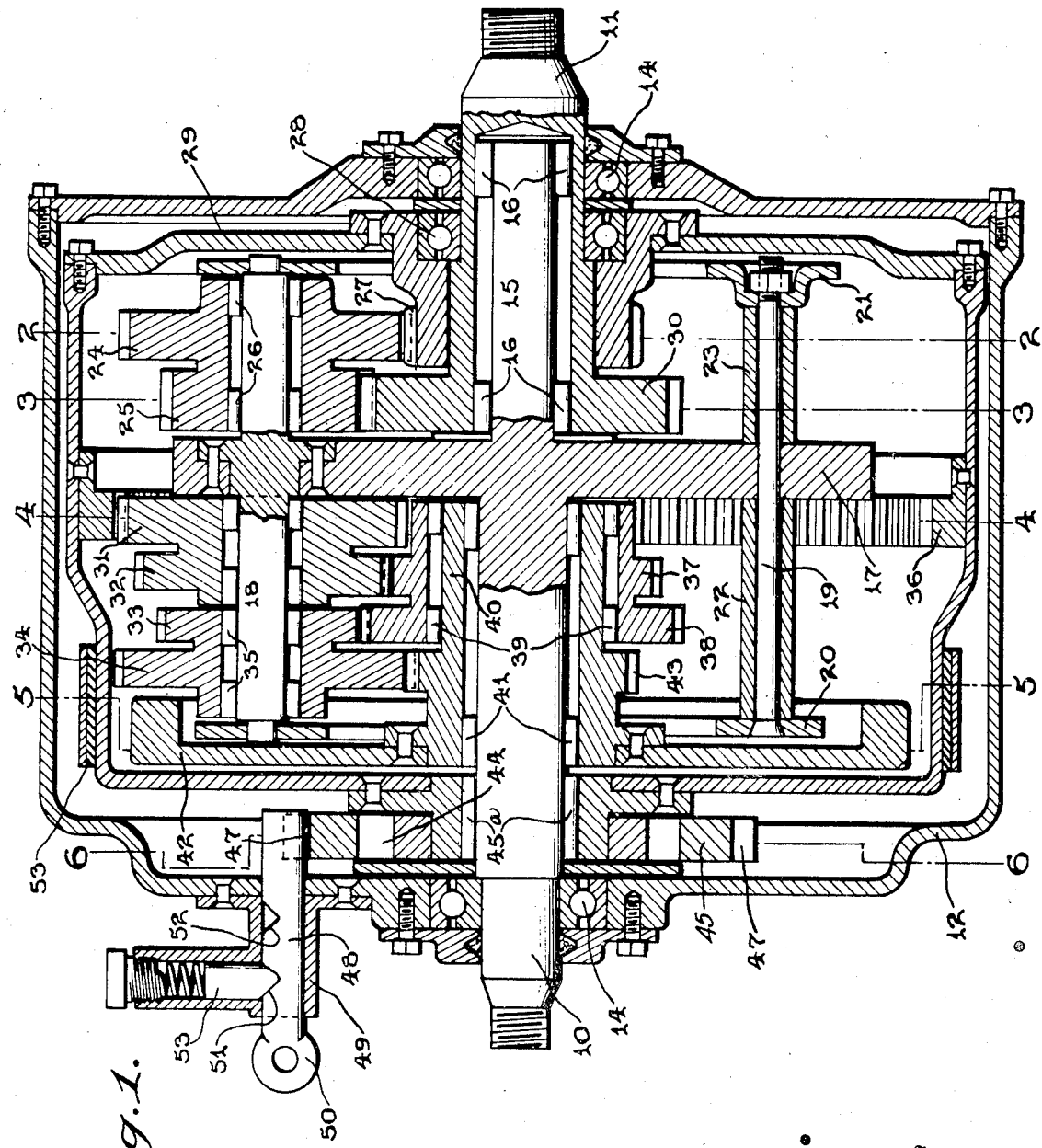

April 1, 1930.                    Z. ALEXANDER                    1,753,104
                                  TRANSMISSION
                              Filed June 17, 1929              2 Sheets-Sheet 1

Inventor
Zeno Alexander,
By
       Attorney

April 1, 1930.  Z. ALEXANDER  1,753,104
TRANSMISSION
Filed June 17, 1929  2 Sheets-Sheet 2
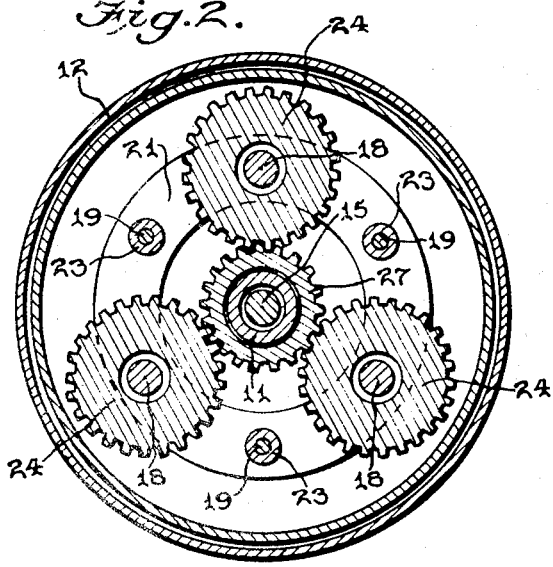
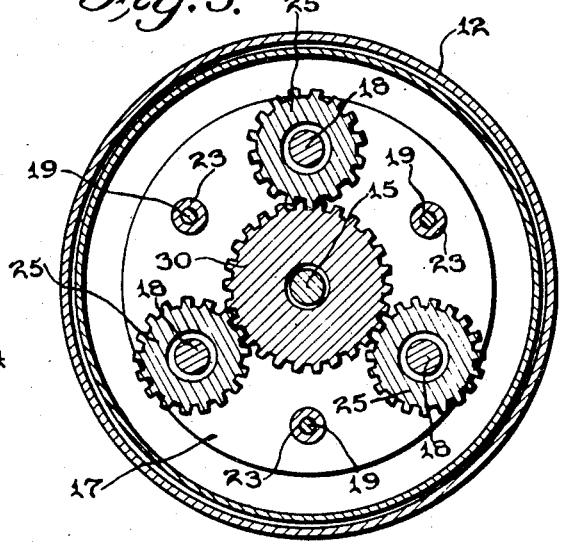
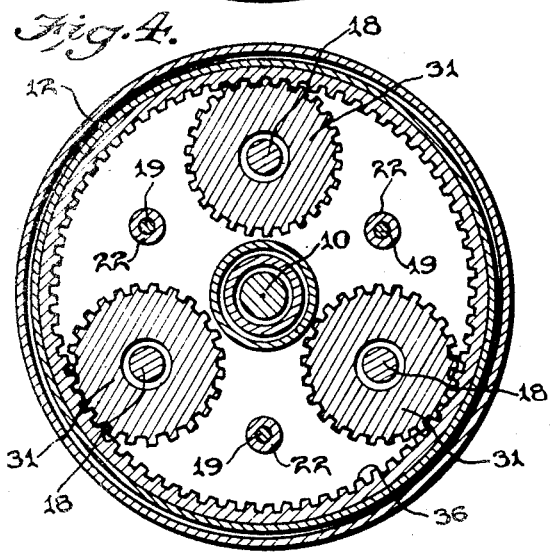
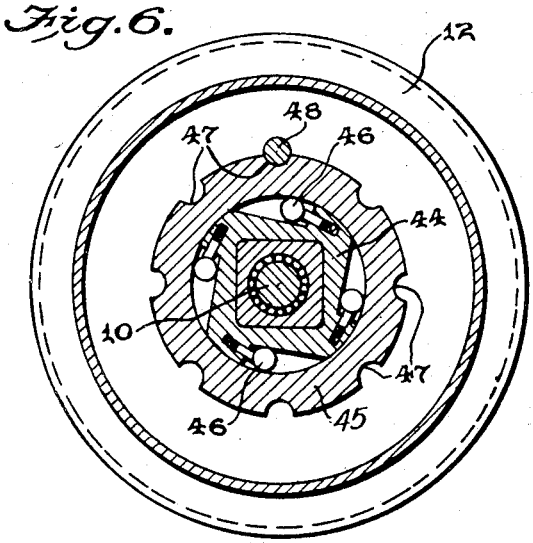
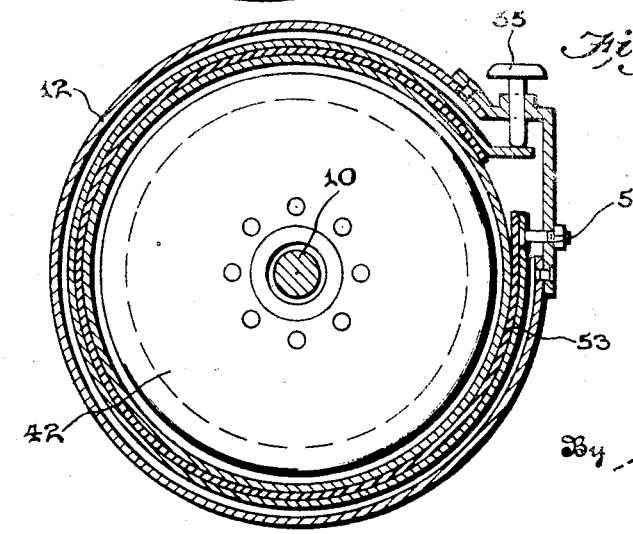
Inventor
Zeno Alexander,
By
Attorney Patented Apr. 1, 1930

1,753,104

UNITED STATES PATENT OFFICE

ZENO ALEXANDER, OF KANSAS CITY, MISSOURI

TRANSMISSION

Application filed June 17, 1929. Serial No. 371,549.

The object of the invention is to provide a transmission for inclusion between a prime mover and its load, so that where the load is subjected to variations, as where it constitutes a motor vehicle, its speed may be automatically reduced to provide the increased torque necessary for its movement without change in the speed of the driver; to provide a transmission in which a floating member is included as an element thereof, said floating member being operatively connected to an inert member which it is designed to set in motion and by which control is thereafter affected; and to provide a transmission susceptible of having certain of its parts so controlled that a retarding tendency may be had on the load through the prime mover, as in the case of a motor vehicle descending an incline.

With this object in view the invention consists in a construction and combination of parts of which a preferred embodiment is illustrated in the accompanying drawings, wherein:

Figure 1 is a central longitudinal sectional view of the invention.

Figures 2, 3, 4, 5 and 6 are sectional views on the planes indicated by the lines 2—2, 3—3, 4—4, 5—5, and 6—6 respectively of Figure 1.

The driving and driven shafts 10 and 11 which are designed respectively for connection to a prime mover and to a load, as for example the driving motor and torque shaft of a motor vehicle, are journalled in the forward and rear ends of a casing 12. Ball bearings 14 are mounted in the end walls of the casing for the support of the driving and driven shafts and the two being in axial alignment, the former is provided with a pilot extension 15 entering an axial bore in the latter in which it is supported on appropriate roller bearings 16.

The driving shaft 10 is formed with a carrier plate 17 to which are secured the shafts 18, the latter paralleling the driving shaft 10. In the present embodiment of the invention three shafts 18 are employed and between them there are disposed the axial tie bolts 19, these bolts passing through and securing the rings 20 and 21 in place and in engagement with the ends of the shafts 18, spacing sleeves 22 and 23 being mounted on the tie bolts between the carrier plate 17 and the rings 20 and 21.

On the rear extensions of the shafts 18 are mounted the pinions 24 and 25, these being integrally formed and supported on roller bearings 26. The pinions 24 mesh with a gear 27 disposed in surrounding relation to the drive shaft 11 and supported on a ball bearing 28, this gear being connected with the rear wall of a drum 29 which constitutes a floating element of the mechanism. The pinions 25 mesh with a gear 30 carried by the driven shaft 11. On the forward extensions of the shafts 18 are mounted the pinions 31 and 32 which are integrally connected and also the pinions 33 and 34 which are likewise integrally connected, both sets of pinions being mounted respectively on roller bearings 35. The pinions 31 mesh with an annular gear 36 carried on the inner periphery of the drum 29, the pinions 32 meshing with a gear 37 which is formed integrally with a gear 38, the latter meshing with the pinions 33. The gear pair 37—38 is carried on roller bearings 39 and is disposed in surrounding relation to a hub 40 supported on roller bearings 41 on the drive shaft 10. The hub 40 carries an inert member 42 in the form of a fly wheel which is inclosed within the drum 29. The hub 40 is also formed with a gear 43 with which the pinions 34 mesh. If there be relative movement between the annular gear 36 and the pinions 31, therefore, the fly wheel 42 will be set in motion at a relatively great angular velocity by reason of the train of gears comprising the gears and pinions indicated at 32, 27, 38, 33, 34 and 43.

The drum 29 is a floating member and the construction herein disclosed provides for it being controlled so that it may be prevented from any movement whatever, permitted of movement in one direction only, or permitted movement in either direction. To provide for its movement in one direction there is an overrunning clutch consisting of an inner member 44 which is secured to the drum 29 at the forward end, the latter having its forward support in the form of roller bearings 45ª so that it may move with reference to the drive shaft 10, the rear support being the ball bearing 28 before referred to. Surrounding the inner member 44 is an outer member 45 between which and the inner member relative angular movement in one direction is precluded by reason of the spring pressed balls 46 which, however, permits relative angular movement in the opposite direction. The clutch comprising the members 45 and 44 and their attendant balls is of the conventional overrunning clutch form and the member 45 is mounted to be retained stationary with respect to the case or housing 12 or to rotate freely with the member 44. To this end, the member 45 is formed with a series of peripheral slots 47 which are uniformly spaced and any one of which may be engaged with the locking pin 48 which is slidably mounted in a guide 49 formed in the front wall of the case 12. At the forward end, the locking pin is formed with an eye 50 for connection with an appropriate actuating lever. The pin is notched or recessed as indicated at 51 and 52, so that the latching pawl 53 may be engaged with either. When the pawl is engaged with the notch 51 the locking pin is seated in one of the slots 47 and the clutch member 45 retained stationary with respect to the case 12. When the pawl is engaged in the notch 52, the locking pin is moved out of locking position with reference to the clutch member 45 and the latter moves freely then in either direction with the clutch member 44, and by reason of the member 45 being unrestrained, the drum 29 is free to move in either direction.

To provide for arresting or stopping the drum, a contractile brake band 53 is employed, one end being anchored as at 54 to the case or housing 12 and the other end being connected with a depressible foot pedal 55. Depression of the pedal serves to contract band 53 on the drum and when pressure on the pedal is removed, the band expands out of contact with the drum, so that in one position of the band, the drum is restrained and in the other position permitted free movement in so far as the brake band is concerned.

In operation, let it be assumed that the prime mover rotates right-handedly and that the direction of the drive shaft 10 is right handedly with the point of sight considered at the left of Figure 1. If the latch pin 48 be in engagement with one of the slots 47, the member 45 of the clutch will be stationary, but the member 44 may move right-handedly, the clutch being so positioned that the balls will not wedge in such relative movement of the clutch parts. Since the member 44 is rigidly connected with the drum 29, the latter may move right-handedly but is precluded from any left-hand direction of movement. With the drive shaft 10 moving right-handedly, the carrier disk 17 also moves right-handedly, carrying the planet pinions around bodily in a right-hand direction. By reason of the pinions 24 meshing with the gear 27, these pinions will have axial rotation right-handedly as will also the pinions 25 which would result in left-handed rotation of the gear 30, were it not for the fact that gear train 27, 24, 25, and 30 are in descending ratio. The bodily movement of the pinions 24 and 25, therefore, right-handedly, right-hand rotation is imparted to the gear 30 and to the driven shaft but at a slower angular velocity than that at which the driving shaft 10 moves. In starting the load, the tendency is to rotate the drum 29 left-handedly but the overrunning clutch prevents this and the drum remains stationary until the torque of the load falls off enough to permit the drum moving right-handedly which it does, slowly at first, and accelerating until it reaches synchronous speed with the drive shaft, the axial rotation of the pinions 24 and 25 dropping off until the drum and the load, finally reaching the speed of the drive shaft, the pinions 24 and 25 have no further axial rotation.

When the drum is at rest or lagging behind the speed of the drive shaft, rapid rotation of the fly wheel 42 is set up. The carrier 17 moving right-handedly, the pinions 31, 32, 33 and 34 are rotated bodily right-handedly but the pinions 31 and 32 are rotated left-handed axially by reason of the former meshing with the annular gear 36. The gears 37 and 38 are thus rotated right-handedly, the pinions 33 and 34 left-handedly on their own axis and the gear 43 and fly wheel 42 right-handedly. By reason of the descending ratio of the gear train between the annular gear 36 and the fly wheel 42, the latter has its greatest angular velocity when the drum 29 is at rest, this exceeding the angular velocity of the drive shaft but dropping off as the drum accelerates up to synchronism with the drive shaft. When the prime mover is started, therefore, with the outer clutch member 45 held stationary, the drum 29 at the initial instant is stationary and the load is started at very low speed, the fly wheel being accelerated to the point of its greatest velocity and as the torque required for the movement of the load drops off, the drum picks up speed, the angular velocity of the fly wheel dropping off, until finally the drive shaft, drum, fly wheel and load rotate at the same angular velocity.

Assuming that there is a demand for increased torque in the load, as in the ascent of an incline when the invention comprises an element of a motor vehicular apparatus. This increased torque required is reflected in a tendency to retard the rotation of the drum 29. Since any dropping off in the speed of the latter must be attended with an increase in the angular velocity of the fly wheel 42, the same is accelerated.

Thus the increased torque demanded by the load is attended with a reduction in the speed of the driven shaft 11 by reason of the fact that the drum 29 may lag in speed behind that of the driver 10. The inert member or fly wheel 42, whose angular velocity is controlled by the drum serves as a means to absorb the shocks that would ordinarily attend the changing in speed of the different parts. Thus the speed of the load may equal that of the drive shaft or drop below the latter in any ratio that may be demanded by the torque required and changes in velocity are attended with no shock or jerkiness because of the provision of the fly wheel 42 by which all such shocks are absorbed.

The construction provides for retarding the load through the prime mover, as where there is a tendency inherent in the load to increase the speed of the driven shaft over that of the drive shaft. This is the condition where, in a vehicular apparatus, the latter is descending a hill. The brake band 53 is then made to function by pressure upon the pedal 55. The band contracting on the drum 29, the latter is prevented from rotating in either direction. The turning tendency is then in the driven shaft 11 whose gear 30 tends to rotate the pinion 25 axially in a left-handed direction, but this pinion being integral with the pinion 24 and the latter in mesh with the gear 27 which is held stationary, no such left-handed rotation is possible and the pinion must not only be rotated right-handedly on its own axis but is carried bodily around in a right-handed direction, rotating the gear disk 17 right-handedly and the drive shaft 10 in the same direction that the latter is moved by the prime mover. With the turning force coming from the driven shaft and the gear ratio in this case being ascending, the tendency is to rotate the prime mover above its normal speed which is reflected in a retardation in the speed of the driven member, the fly wheel functioning in this case as in the others above described.

By reason of the fly wheel being accelerated at the time of starting the load, its potential energy is always useful in creating a right-handed turning force on the drum, since any lag of the drum behind synchronous speed with the driver will always be attended with acceleration of the fly wheel.

If the latch pin 48 be withdrawn from engagement with the clutch member 45, so that the pawl 50 is seated in the notch 51, the drum 29 is unrestrained and may move in either direction. This release feature of the invention is unnecessary in the general run of motor vehicles but will be found useful if the invention is used on motor cycles, since it will release the transmission mechanism and permit movement of the motor cycle easily by the mere act of pushing and that without having to turn any of the gear elements of the mechanism.

The invention having been described what is claimed as new and useful is:

1. A transmission comprising driving and driven members, an epicyclic gear train operatively connecting the two to provide for relative changes of speed between the same, an inert member operatively connected with an element of said train to be accelerated by it beyond the speed of either member upon any relative change of speed between the two, and means to arrest the movement of said element in one direction but permit it in the other.

2. A transmission comprising driving and driven members, an epicyclic gear train operatively connecting the two to provide for relative changes of speed between the same, an inert member operatively connected with an element of said train to be accelerated by it beyond the speed of either member upon any relative change of speed between the two, said element being mounted to permit its free movement in either direction, and means selectively engageable and disengageable with said element to secure said element against rotation or to permit its free movement.

3. A transmission comprising driving and driven members, an epicyclic gear train operatively connecting the two to provide for relative changes of speed between the same, an inert member operatively connected with an element of said train to be accelerated by it beyond the speed of either member upon any relative change of speed between the two, and means operatively connected with said element to permit forward but preclude retrograde movement of the same, said means being releasable to permit free movement of said element in either direction.

4. A transmission comprising driving and driven members, an epicyclic gear train operatively connecting the two, a drum enclosing said train and operatively connected with an element thereof, said drum being rotated by said connecting element, a fly wheel concentric with one of said members, an epicyclic gear train operatively connecting said fly wheel and said drum, and an overrunning clutch having members of which one is fixed and the other connected with said drum.

5. A transmission comprising driving and driven members, an epicyclic gear train operatively connecting the two, a drum enclosing said train and operatively connected with an element thereof, said drum being rotated by said connected element, a fly wheel concentric with one of said members, and an epicyclic gear train operatively connecting said fly wheel and said drum, and means operatively connected with the drum to restrict the turning movement of the latter to one direction.

6. A transmission comprising driving and driven members, an epicyclic gear train operatively connecting the two, a drum enclosing said train and operatively connected with an element thereof, said drum being rotated by said connected element, a fly wheel concentric with one of said members, and an epicyclic gear train operatively connecting said fly wheel and said drum, and means operatively connected with the drum to restrict the turning movement of the latter to one direction, said means being actuable to render the same inoperative and permit rotation of the drum in either direction.

7. A transmission comprising driving and driven members, an epicyclic gear train operatively connecting the two, a drum enclosing said train and operatively connected with an element thereof, said drum being rotated by said connecting element, a fly wheel concentric with one of said members, and an epicyclic gear train operatively connecting said fly wheel and said drum, and means operatively connected with the drum to restrict the turning movement of the latter to one direction, said means being actuable to render the same inoperative and permit rotation of the drum in either direction, and a brake band selectively engageable with and disengageable from the drum to secure the latter against rotation in either direction or permit its free movement in either direction.

8. A transmission comprising driving and driven members, an epicyclic gear train operatively connecting the two, a fly wheel concentric with one of said members, and a drum enclosing the fly wheel and said train and operatively connected with an element thereof, and an annular gear carried by the drum, an epicyclic gear train operatively connecting said annular gear and said fly wheel, and an overrunning clutch connected with said drum to restrict rotation of the latter to one direction.

9. A transmission comprising driving and driven members, an epicyclic gear train operatively connecting the two, a fly wheel concentric with one of said members, and a drum enclosing the fly wheel and said train and operatively connected with an element thereof, and an annular gear carried by the drum, an epicyclic gear train operatively connecting said annular gear and said fly wheel, and an overrunning clutch connected with said drum to restrict rotation of the latter to one direction, said clutch having means actuable to render it inoperative and to permit rotation of the drum in either direction.

10. A transmission comprising driving and driven members, an epicyclic gear train operatively connecting the two, a fly wheel concentric with one of said members, and a drum enclosing the fly wheel and said train and operatively connected with an element thereof, and an annular gear carried by the drum, an epicyclic gear train operatively connecting said annular gear and said fly wheel, and an overrunning clutch connected with said drum to restrict rotation of the latter to one direction, said clutch having means actuable to render it inoperative and to permit rotation of the drum in either direction, and a foot-actuated brake band encircling the drum by which the latter may be secured against rotation in either direction.

In testimony whereof he affixes his signature.

ZENO ALEXANDER.